United States Patent
Amate López et al.

(10) Patent No.: US 9,828,071 B2
(45) Date of Patent: Nov. 28, 2017

(54) VESSEL FOR TRANSPORTING AND INSTALLING A FLOATING PLATFORM AND METHOD FOR TRANSPORTING AND INSTALLING A FLOATING PLATFORM USING SAID VESSEL

(71) Applicant: IBERDROLA INGENIERIA Y CONSTRUCCIÓN, S. A. U., Erandio (Vizcaya) (ES)

(72) Inventors: Juan Amate López, Erandio (ES); Jaime Dominguez Soto, Erandio (ES); Victor De Diego Martín, Erandio (ES); Bernardino Couñago Lorenzo, Erandio (ES)

(73) Assignee: Iberdrola Ingenieria Y Construccion S.A.U., Erandio (Vizcaya) (ES)

( * ) Notice: Subject to any disclaimer, the term of this patent is extended or adjusted under 35 U.S.C. 154(b) by 0 days.

(21) Appl. No.: 14/434,112

(22) PCT Filed: Oct. 8, 2013

(86) PCT No.: PCT/ES2013/070697
§ 371 (c)(1),
(2) Date: Apr. 8, 2015

(87) PCT Pub. No.: WO2014/057156
PCT Pub. Date: Apr. 17, 2014

(65) Prior Publication Data
US 2017/0120993 A1 May 4, 2017

(30) Foreign Application Priority Data
Oct. 8, 2012 (ES) .................................. 201231549

(51) Int. Cl.
*B63B 1/00* (2006.01)
*B63B 35/00* (2006.01)
(Continued)

(52) U.S. Cl.
CPC ............ *B63B 35/003* (2013.01); *B63B 1/042* (2013.01); *B63B 35/28* (2013.01); *E02B 17/027* (2013.01);
(Continued)

(58) Field of Classification Search
CPC ........ B63B 35/003; B63B 35/28; B63B 1/042
See application file for complete search history.

(56) References Cited

U.S. PATENT DOCUMENTS

2012/0183359 A1  7/2012 Nordstrom et al.

FOREIGN PATENT DOCUMENTS

| DE | 102008046359 A1 | 3/2010 |
| EP | 2495162 A1 | 2/2012 |
| WO | 03055741 A1 | 10/2003 |

*Primary Examiner* — Stephen P Avila
(74) *Attorney, Agent, or Firm* — McNees Wallace & Nurick LLC

(57) ABSTRACT

The invention allows setting up floating platforms comprising an elongated central body (1) from the lower portion of which legs (2) come out intended to fix the platform to anchoring elements arranged in the sea bed (5). The vessel comprises: a) a longitudinal through groove (4) up to the vessel bottom, and leaving part of the vessel bow (5) open; and b) a plurality of slots (6, 7) placed at the bottom of the vessel, wherein the groove (4) and the slots (6, 7) are configured both in dimension and in shape in such a way that they fit in at least some of the legs (2), so that the legs (2) can be inserted, at least partially, in the slots (6, 7) to attach the platform to the vessel.

20 Claims, 4 Drawing Sheets

(51) Int. Cl.
  *B63B 35/28* (2006.01)
  *E02B 17/02* (2006.01)
  *F03D 13/25* (2016.01)
  *F03D 13/40* (2016.01)
  *B63B 1/04* (2006.01)
  *E02B 17/00* (2006.01)
  *B63B 21/50* (2006.01)
  *B63B 35/44* (2006.01)

(52) U.S. Cl.
  CPC ............. *F03D 13/25* (2016.05); *F03D 13/40* (2016.05); *B63B 2001/044* (2013.01); *B63B 2021/505* (2013.01); *B63B 2035/446* (2013.01); *E02B 2017/0039* (2013.01); *E02B 2017/0047* (2013.01); *E02B 2017/0065* (2013.01); *E02B 2017/0091* (2013.01); *F05B 2240/93* (2013.01); *F05B 2240/95* (2013.01); *Y02E 10/727* (2013.01)

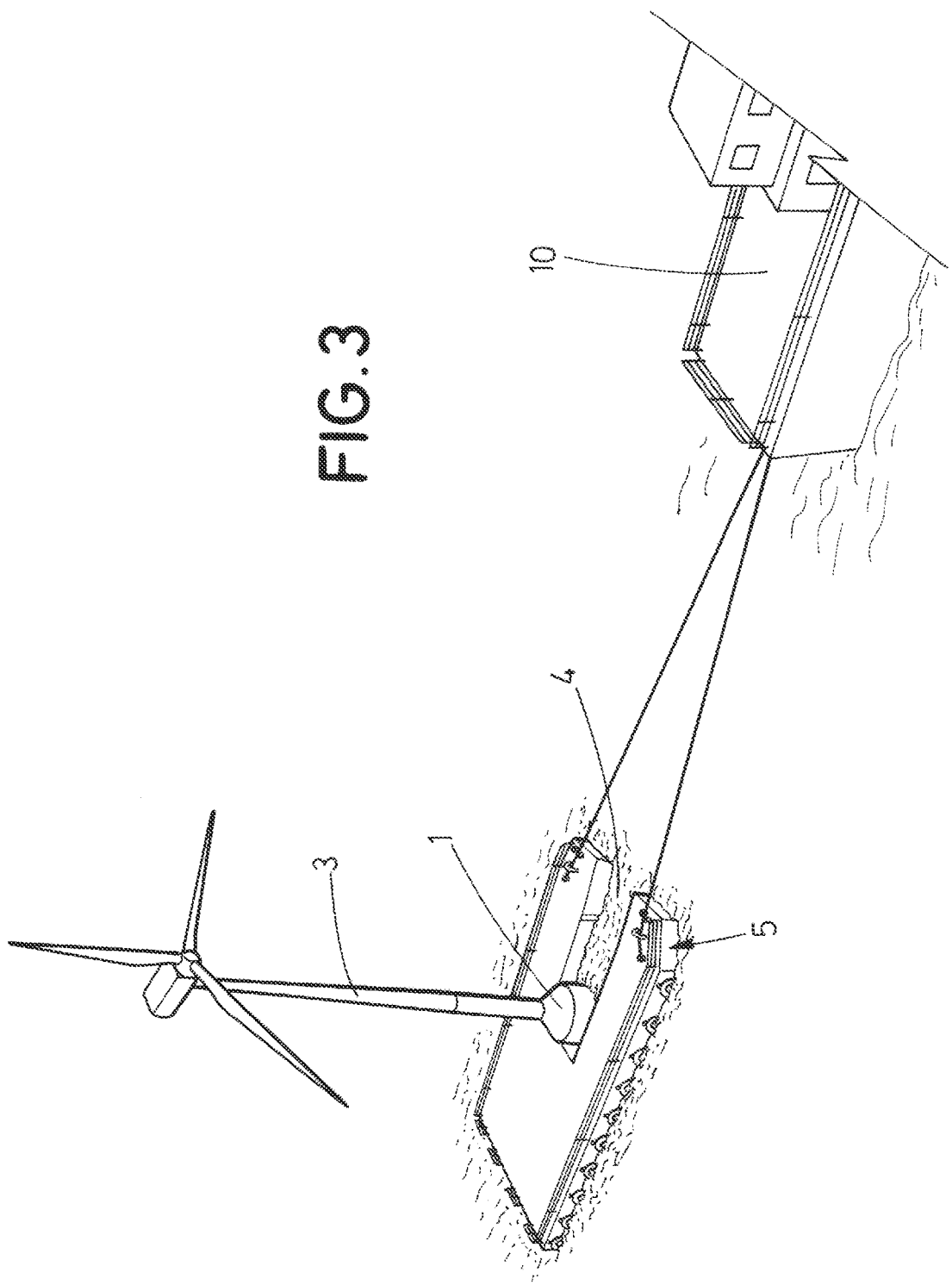

VESSEL FOR TRANSPORTING AND INSTALLING A FLOATING PLATFORM AND METHOD FOR TRANSPORTING AND INSTALLING A FLOATING PLATFORM USING SAID VESSEL

OBJECT OF THE INVENTION

The present invention may be included in the technical field of marine constructions. In particular, the object of the present invention refers to a vessel for transporting and setting up a floating platform, and to a method for transporting and setting up a floating platform using said vessel.

BACKGROUND OF THE INVENTION

Some of the floating platforms for the wind energy utilisation in offshore facilities are tension-leg platforms (also referred to as "TLP", Tension Leg Platform), which are formed by a central body intended to be partially submerged, from the lower portion of which a plurality of legs (also referred to as pontoons) come out extending outwardly, and which can be fixed, through tendons, to anchoring elements arranged in the sea bed, where the anchoring elements are preferably piles driven into the sea bed. The central body and/or the legs have tanks which, together with pumping means outside the platform, cause ballasting and deballasting, at requirement, of the central body and the legs until reaching the desired depth.

A method for setting up said floating platforms comprises the following steps:
  Arrangement of the platform in the water, in the required stability conditions, this stage being also referred to as floating step.
  Transporting the platform once in the water to the setting up location, and
  Fixing the platform to the sea bed, by joining the platform to tendons or mooring lines, eventually followed by starting operation thereof.

Setting up of floating platforms of the TLP type implies a high difficulty, due to factors such as for example the over-buoyancy of the platforms, their instability, and the necessity for them to be transported (either carried or towed) up to the setting up site.

It is an object of the present invention to describe a method for setting up floating platforms which solves the disadvantages mentioned above.

DESCRIPTION OF THE INVENTION

The present invention solves the technical problem stated, by means of, according to a first aspect, a vessel for transporting and setting up a floating platform and, by means of a second aspect, a method of setting up a floating platform using said vessel.

The vessel is intended to be used for setting up floating platforms provided with a central elongated body from the lower portion of which a plurality of legs come out extending outwardly from the central body, and being intended to fix the platform, through tendons, to anchoring elements arranged in the sea bed. The anchoring elements are preferably piles which are driven into the sea bed, at least partially.

In order to achieve this object, the vessel comprises a longitudinal through groove running from the deck to the bottom of the vessel, leaving part of the bow open, said vessel also comprising a bottom provided with slots, wherein the groove and the slots are, in terms of shape and dimensions, configured in such a way that they match the shape of at least some of the legs and optionally also of the central body, so that the legs and, where appropriate, the central body, can be, at least partially, inserted in the slots so as to be attached to the vessel, in such a way that the contact surface of the platform with the boat or vessel is extended.

The method of the invention comprises the steps of:
  Arranging the platform in the water, in the required stability conditions, this stage being also referred to as floating step.
  Bringing the above described vessel near the platform, thus allowing the groove to enclose the central body;
  Inserting the legs in the slots so that the platform is fixed to the vessel. This operation is carried out by means of ballasting and deballasting of tanks provided in the floating platform. By means of these two last steps, it is achieved that the platform is attached to the vessel and that it is transported together with said vessel. Additionally, the vessel is provided with a plurality of floodable compartments and of pumps which allow ballasting and deballasting said vessel, to obtain different drafts, as it is required.
  Towing the platform placed in the water up to a location, using the vessel described above,
  Ballasting the assembly vessel and platform until reaching a required setting up draft, and
  Mooring the floating platform in its location, using mooring lines, followed by starting operation thereof if required or if previously scheduled.

Optionally, the vessel may include additional security means which allow attaching some platform areas to the vessel, so as to improve stability of the platform during its transport to the setting up location.

Additionally, and also optionally, the vessel may comprise, on the deck, fastening elements adapted to fasten and vertically guide, which allow fixing the floating platform, so as to increase security during transport and setting up operations. The fastening elements are preferably connected to cables, which in turn are attached to active winches, which make it possible to control the lowering of the assembly platform and wind turbine, during the setting up operation.

The vessel may be self-propelled but, preferably, for the sake of a higher simplicity, the vessel is not self-propelled, being the use of a tugboat towing the vessel together with the platform envisaged.

Preferably, the vessel additionally includes a plurality of hollow floodable flotation bodies, placed on the deck and vertically protruding from said deck upwards.

By flooding the vessel compartments and additionally the flotation bodies, if necessary, it is enabled, in case that it is necessary to reach the desired setting up draft, to submerge the vessel deck, the free ends of the flotation bodies protruding above the water line even when the deck is submerged.

The flotation bodies preferably have an elongated slender shape, in order to achieve higher drafts during the setting up operations. Flotation bodies having a prismatic (with a triangular or quadrangular base, etc.) or cylindrical (with a circular or elliptical base, etc.) shape are preferred.

Similarly, the number of flotation bodies is preferably four, preferably placed near the ends of the deck (therefore, being as distant as possible from the centre of gravity of the vessel), with the purpose of having the bigger inertia possible in floating with respect to the centre of gravity and, thus, guaranteeing the stability of the assembly during the setting up operation.

Application of the flotation bodies is, similarly, of especial interest with respect to the method of setting up the floating platform mentioned above. In particular, the vessel may be ballasted up to a higher draft, thanks to the presence of the flotation bodies, prior to the steps of: bringing the vessel near the platform so that the groove encloses the central body; and/or inserting the legs in the slots so that the platform is attached to the vessel. Additionally, during towing of the platform-vessel assembly, as well as during mooring of the platform once the location is reached, the action of the flotation bodies turns into a greater stability of the platform-vessel assembly (due to the great inertia in floating and re-location in a lower position of the centre of gravity of the setting up platform-boat assembly) during setting up operation.

Once the floating platform is mooring, the vessel is deballasted emptying the flotation bodies and, where appropriate, the compartments, until an adequate draft is reached, and then the vessel is withdrawn, using in this case the tugboat mentioned above.

Likewise, it should be noted that using the embodiment in which the vessel includes the flotation bodies, the possibility arise to use the same vessel successively for floating platforms having different configurations and different sizes.

DESCRIPTION OF THE DRAWINGS

To implement the present description and in order to provide a better understanding of the characteristics of the invention, according to a preferred embodiment thereof, a set of drawings is attached as part of this description, with an illustrative but not limitative purpose, which represents the following:

FIG. 3 shows a perspective view of a boat towing the assembly platform-vessel.

PREFERRED EMBODIMENT OF THE INVENTION

The following is a detailed description of a preferred embodiment of the invention, referring to FIGS. 1 to 4 above.

Figure 1:
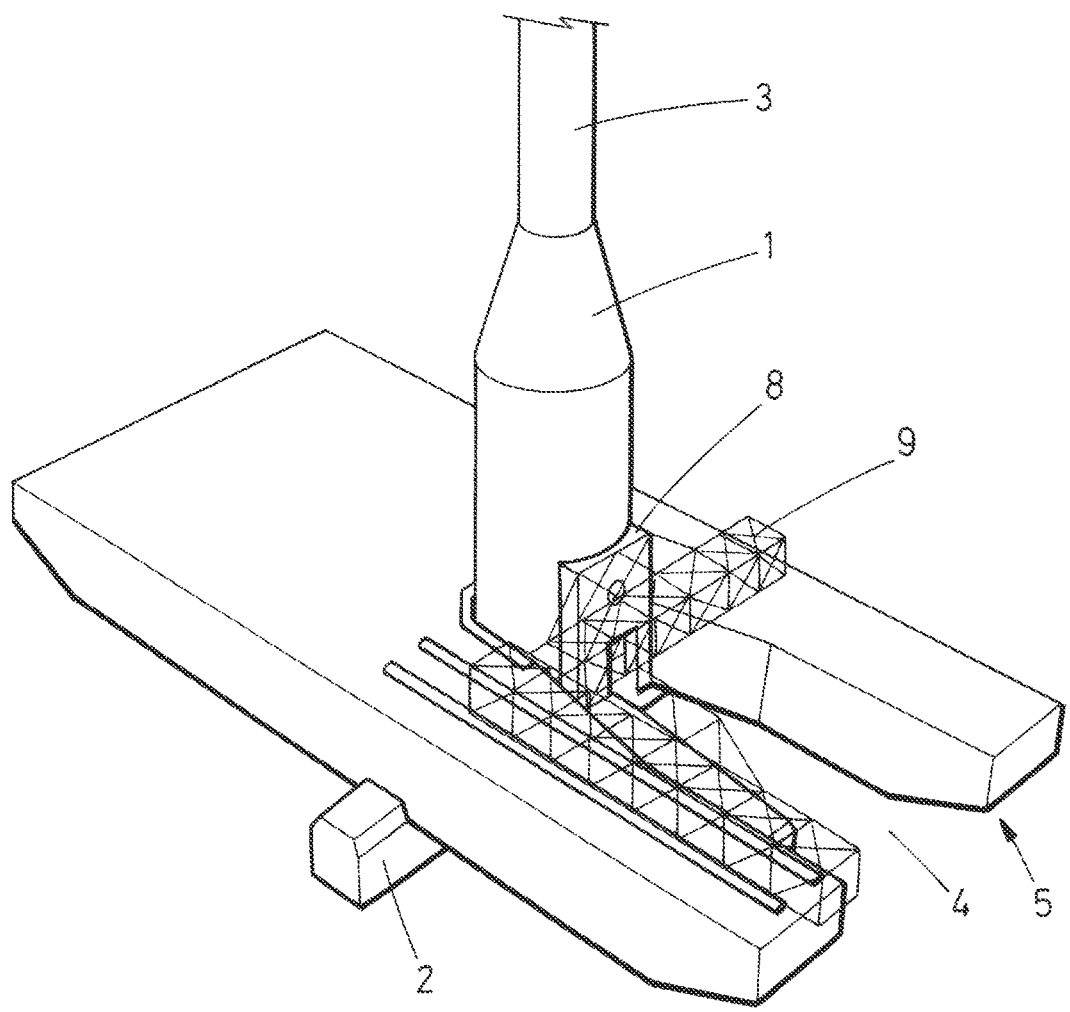
FIG. 1 shows an upper perspective of the platform attached to the vessel of the invention, as well as auxiliary fixing means.

As it can be seen in FIG. 1, using the vessel and setting up methods described in the invention, it is possible to set up a floating platform of the TLP type comprising an elongated central body (1) and a plurality of legs (2), coming out from the lower portion of the central body (1) and extending outwardly from the central body (1), wherein the legs (2) are intended to be fixed by means of tendons (not shown) to piles (not shown) driven into the sea bed.

Preferably but not exclusively, the invention is intended to set up floating platforms as those described herein, which additionally comprise, in the upper portion of the central body (1), a surface intended to support a wind turbine (3). Also preferably, the platform may include a generator to transform tidal energy into electricity, that generator being arranged, for example, floating at the water level and attached by means of guides to the central body (1) of the platform.

The invention refers to a vessel for setting up a floating platform, wherein said vessel is not self-propelled, and where it comprises a longitudinal through groove (4) running from the deck (12) up to the bottom of the vessel, located in a central position with respect to the vessel beam (that is, the transversal dimension port-starboard) and leaving part of the bow (5) open, in this case the central part of the bow (5), since the groove (4) is centrally arranged.

The vessel also comprises a bottom provided with slots (6, 7), adapted both in terms of dimension and shape so as to, cooperating with the groove (4), accommodate the legs (2) and the central body (1), in such a way that the legs (2) and the central body (1) can be at least partially inserted in the slots (6, 7), to attach the platform to the vessel.

Figure 2A:
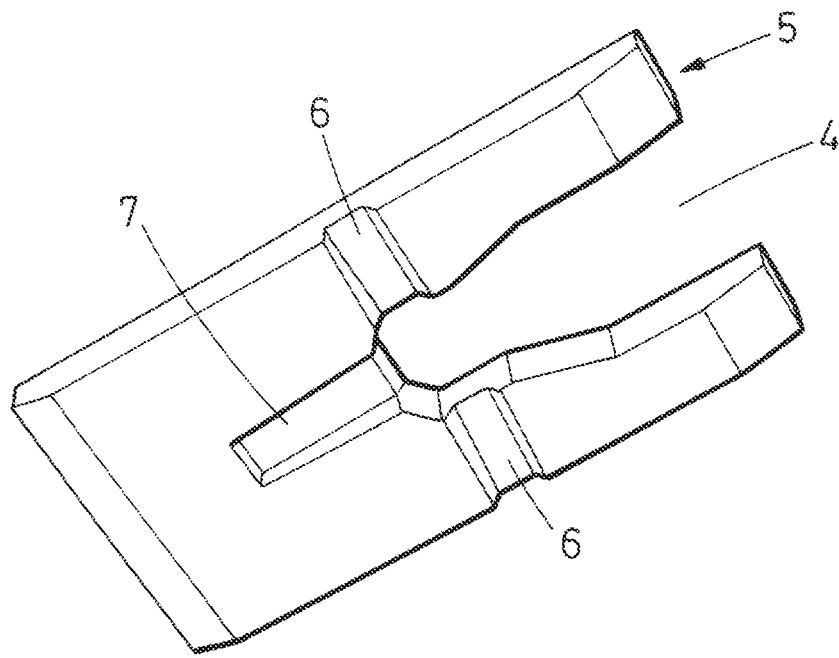
FIGS. 2a and 2b show lower perspectives of the bottom of the vessel without the platform (FIG. 2a) and once attached to the platform (FIG. 2b).
Figure 2B:
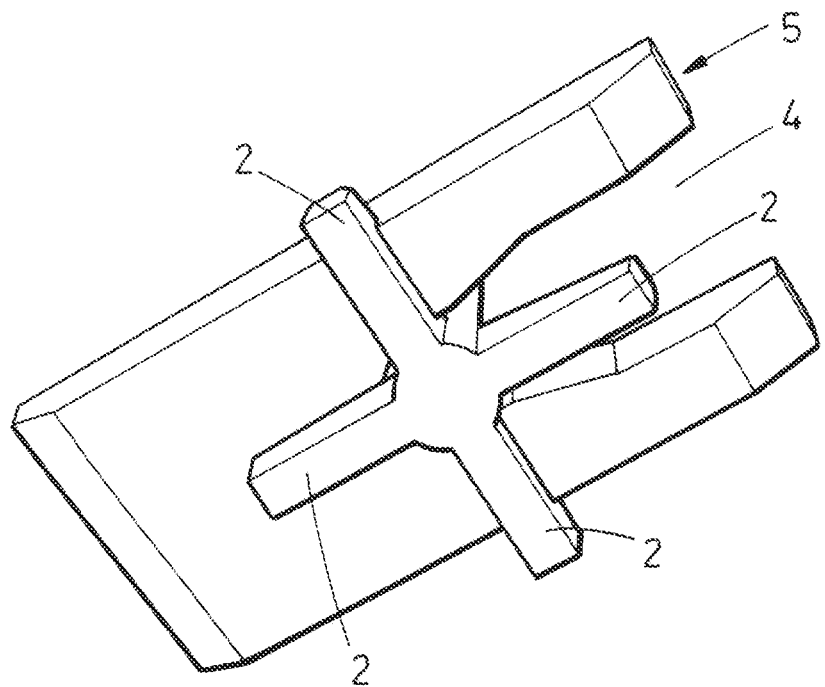

In the preferred embodiment shown more clearly in FIGS. 2a and 2b, the vessel is intended to be used with a platform comprising four legs (2) having equidistant angles around the perimeter of the central body (1), the slots (6, 7) consequently comprising:

a first slot (6) in the beam direction of the vessel, that is, running from port to starboard, and which can be a through slot in the direction of the beam, so that the legs (2) may protrude from the beam at port and starboard; and a second slot (7), in the longitudinal direction, that is, towards stern, from the innermost end of the groove (4), as an extension of said groove (4), wherein said second slot (7) may be a through slot, enabling the corresponding leg (2) to protrude at stern.

The method of the invention comprises the following steps of:

Arranging the platform in the water, in the required stability conditions.

Bringing the above described vessel near the platform, thus allowing the groove (4) to enclose the central body (1);

Inserting the legs (2) in the slots (6, 7) so that the platform is fixed to the vessel.

Towing the platform placed in the water up to a location, using the vessel.

Ballasting the assembly vessel and platform until reaching a required setting up draft, and Mooring the floating platform in its location, using mooring lines, eventually followed by starting operation thereof if required or if previously scheduled.

As it is shown in FIG. 3, the vessel may include additional fixing means (not shown) which allow attaching some platform areas to the vessel, so as to improve stability of the platform during its transport to the setting up location. In particular, the fixing means may include a stopper system comprising a stopper (8) placed in the rear area of the vessel, within the groove (4), after fitting the legs (2) in the slots (6, 7). The stopper (8) can be a vertical construction supported on the vessel by means of a grid structure (9).

Figure 4:
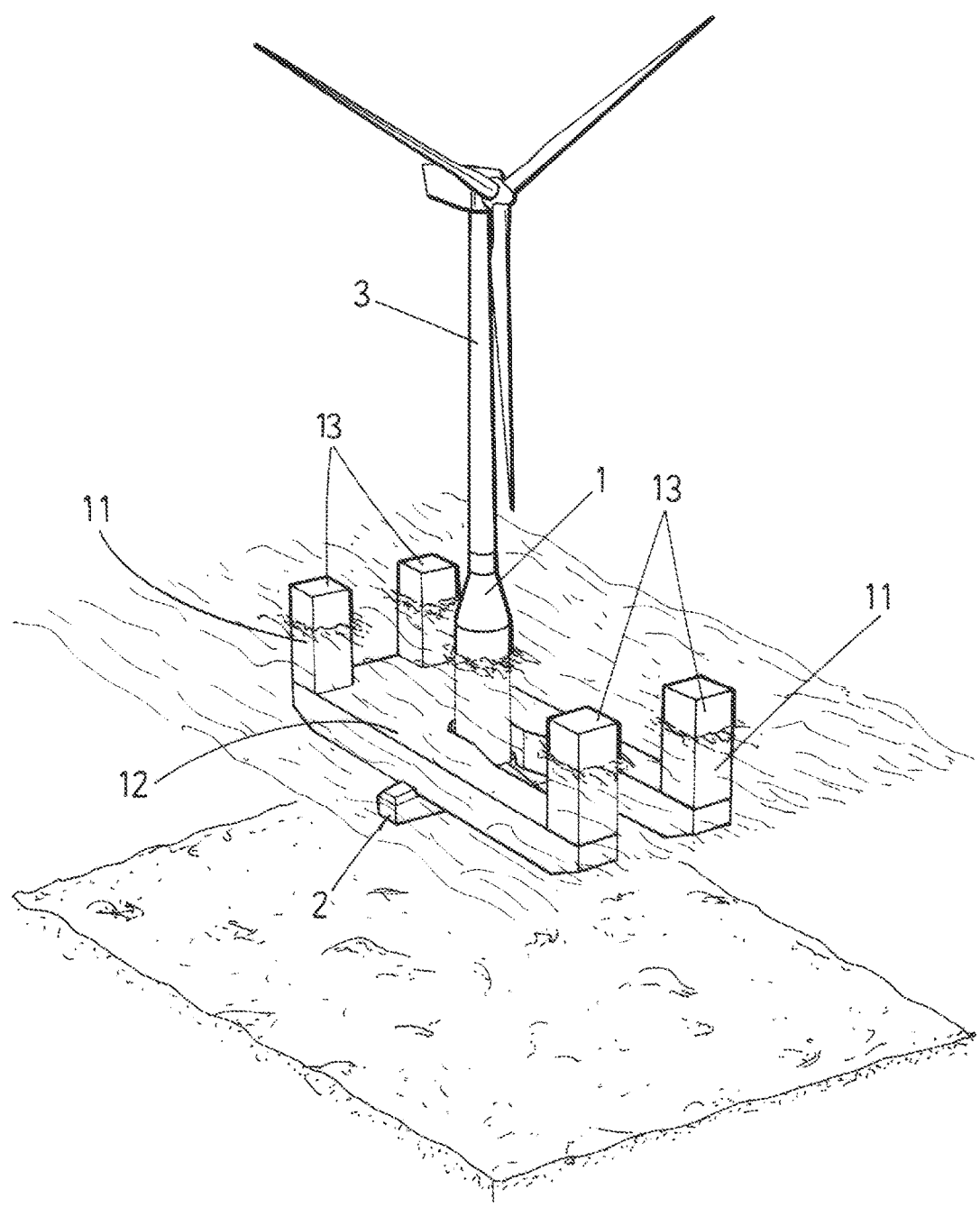
FIG. 4 shows a perspective schematic view of an embodiment of the vessel in which four flotation bodies are included on the vessel deck, protruding vertically upwards.

The vessel is envisaged not to be self-propelled, so a tugboat (10) may be used to tow the vessel all together with the platform up to the final location, as it can be seen in FIG. 4.

The vessel additionally comprises floodable compartments (not shown), into which said vessel is divided, to ease ballasting and deballasting of the vessel.

FIG. 4 shows a preferred embodiment in which the vessel additionally includes a plurality of floodable hollow flotation bodies (11), placed on the vessel deck (12) and protruding vertically from said deck (12) upwards.

When the assembly vessel plus platform is in the selected location, then firstly the compartments of the vessel are flooded and after that, if necessary, the flotation bodies (11) are flooded, in order to submerge the vessel up to the required setting up draft, so that the deck (12) is submerged but the free ends (13) of the flotation bodies (11) protrude over the water line.

FIG. 4 shows a possible arrangement of the four flotation bodies (11) with a slender prismatic shape having a square section placed at the deck (12) ends, symmetrically.

The invention claimed is:

1. A vessel for transporting and setting up a tension leg platform for wind turbines, wherein the floating platform comprises an elongated central body, from a lower portion of which a plurality of pontoons come out extending outwardly from the central body, the pontoons being intended to fix the platform, through tendons, to anchoring elements arranged in the sea bed, wherein the vessel comprises:
    a deck, a bottom and a bow;
    a longitudinal through groove running from the deck up to the bottom, and leaving a part of the vessel bow open; and
    a plurality of slots located at the bottom;
    wherein the groove and the slots are configured both in dimension and in shape in such a way so as to fit in at least some of the pontoons, so that the pontoons are insertable, at least partially, in the slots so as to attach the platform to the vessel.

2. The vessel of claim 1, wherein the slots and the groove are configured both in dimension and in shape so as to additionally fit in the central body, in such a way that the plurality of pontoons are insertable in the slots and in the groove so as to attach the vessel to the platform.

3. The vessel of claim 1, wherein the slots comprise:
    a first slot running from port to starboard in the vessel; and
    a second slot, in the longitudinal direction, towards stern, from an innermost end of the groove, as an extension of said groove.

4. The vessel of claim 3, wherein the first slot is a through slot from port to starboard and/or the second slot is a through slot towards the bow, so as to allow the corresponding pontoons to protrude at port, starboard and/or the bow.

5. The vessel of claim 1, further comprising fixing means to fix the platform to the vessel.

6. The vessel of claim 5, wherein the fixing means include a stopper system comprising a stopper placed in the rear area of the vessel, within the groove.

7. The vessel of claim 6, wherein the stopper is a vertical construction supported on the vessel by means of a grid structure.

8. The vessel of claim 1, further comprising a plurality of floodable hollow flotation bodies, which are placed on the vessel deck, protruding from the deck vertically upwards, to ballast the vessel up to a determined draft, the flotation bodies being configured so as to partially protrude from the water line for said draft.

9. The vessel of claim 8, wherein the flotation bodies have an elongated slender shape.

10. The vessel of claim 8, wherein the flotation bodies are configured and placed so that, under setting up conditions, the vessel features a flotation area, associated to the flotation bodies, that provides enough inertia-at flotation, with respect to the centre of gravity in the flotation plane of the assembly platform and vessel, so as to keep stability of the assembly floating platform and vessel during the setting up process.

11. The vessel of claim 10, wherein the deck comprises four ends, the flotation bodies comprising four flotation bodies, each placed at one corresponding end of the ends of the deck.

12. A method for transporting and setting up a floating tension leg platform for wind turbines, the platform comprising:
    an elongated central body, comprising a lower portion; and
    a plurality of pontoons coming out from the lower portion of the central body, extending outwardly from the central body, the pontoons being intended to fix the platform, through tendons, to anchoring elements arranged in a sea bed;
    wherein the method comprises the following steps of:
    positioning the platform at a dock, quay or construction/fabrication yard, with required ballast conditions so as to guarantee stability;
    assembling a wind turbine on the platform;
    bringing a vessel near the platform, the vessel comprising;
        a deck, a bottom and a bow;
        a longitudinal through groove running from the deck up to the bottom, and leaving a part of the bow open; and
        a plurality of slots located at the bottom of the vessel, the groove and the slots being configured both in dimension and in shape so as to fit in at least some of the pontoons, so that the pontoons are insertable, at least partially, in the slots so as to attach the platform to the vessel;
        wherein the groove is enclosing the central body;
    inserting the pontoons in the slots so that the platform is fixed to the vessel;
    towing together the platform and the vessel up to a location using a tugboat;
    installing the platform in the location, connecting the tendons lines to anchoring elements pre-installed in the sea bed; and
    de-ballasting and disconnecting the vessel from the platform.

13. The method of claim 12, wherein the vessel further comprises a plurality of floodable hollow flotation bodies, which are placed on the deck, protruding from the deck vertically upwards, to ballast the vessel up to a determined draft, the flotation bodies being configured so as to partially protrude from the water line for said draft, the flotation bodies comprising free ends;
    the method further comprising a step of flooding the flotation bodies so as to ballast the vessel up to a determined first draft, referred to as setting up draft, prior to bring the vessel near the floating platform, leaving the free ends of the flotation bodies protruding from the water line.

14. The method of claim 13, wherein when the vessel is ballasted up to the setting up draft, the deck is submerged.

15. The method of claim 12, further comprising an additional step of deballasting the vessel up to a determined second draft after mooring the floating platform, by releasing water from the flotation bodies).

16. The vessel of claim 2, wherein the slots comprise:
    a first slot running from port to starboard in the vessel; and
    a second slot, in the longitudinal direction, towards stern, from an innermost end of the groove, as an extension of said groove.

17. The vessel of claim 16, wherein the first slot is a through slot from port to starboard and/or the second slot is a through slot towards the bow, so as to allow the corresponding pontoons to protrude at port, starboard and/or the bow.

18. The vessel of claim 8, wherein the flotation bodies are configured and placed so that, under setting up conditions, the vessel features a flotation area, associated to the flotation bodies, that provides enough inertia at flotation, with respect to the centre of gravity in the flotation plane of the assembly platform and vessel, so as to keep stability of the assembly floating platform and vessel during the setting up process.

19. The vessel of claim 10, wherein the deck comprises four ends, the flotation bodies comprising four flotation bodies, each placed at one corresponding end of the ends of the deck.

20. The vessel of claim 1, wherein the vessel comprises a hull, the hull comprising the deck, the bottom and the bow; wherein the groove and the slots are made in the hull, so as to attach the platform to the hull.

* * * * *